UNITED STATES PATENT OFFICE 2,592,620

ETHYLXANTHOYLTHIOXY-PIPERIDYL-CYANOPHOSPHINE OXIDE

Henry Tolkmith, Midland, Mich., assignor to The Dow Chemical Company, Midland, Mich., a corporation of Delaware No Drawing. Application December 30, 1950, Serial No. 203,777

1 Claim. (Cl. 260—293.4)

The present invention is directed to ethylxanthoylthioxy-piperidyl-cyanophosphine oxide of the formula

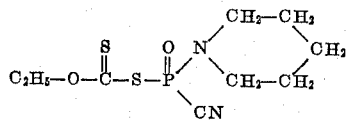

This compound is a viscous oil, somewhat soluble in many organic solvents and substantially insoluble in water. It is of value as an intermediate for the preparation of more complex phosphate derivatives and as a constituent of parasiticide compositions.

The new compound may be prepared by reacting sodium cyanide with S-(ethylxanthoyl) piperidyl thiophosphoric chloride of the formula

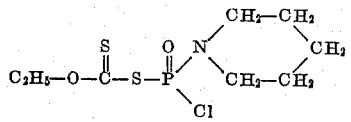

in an inert organic solvent such as benzene. Good results are obtained when employing about 1.3 molecular proportions of sodium cyanide with each molecular proportion of S-(ethylxanthoyl) piperidyl thiophosphoric chloride.

In carrying out the reaction, the sodium cyanide and S-(ethylxanthoyl) piperidyl thiophosphoric chloride are dispersed in the solvent and the resulting mixture heated with stirring for a period of time at a temperature of from 40° to 80° C. Temperatures substantially in excess of 80° C. for any appreciable period of time are to be avoided as the desired product has a tendency to decompose at such temperature. Upon completion of the reaction, the mixture may be filtered and the filtrate distilled under reduced pressure at gradually increasing temperatures up to a temperature of 80° C. to separate low boiling constituents and to obtain as a residue the desired ethylxanthoylthioxy - piperidyl - cyanophosphine oxide.

The S-(ethylxanthoyl) piperidyl thiophosphoric chloride employed as a starting material in the above-described method may be prepared by reacting one molecular proportion of sodium ethylxanthate with one molecular proportion of piperidyl phosphoric dichloride in an inert organic solvent such as benzene. In carrying out the reaction, the reactants are dispersed in the solvent and the resulting mixture heated with stirring for a period of time at a temperature of from 40° to 80° C. To avoid decomposition, temperatures substantially in excess of 80° C. should not be employed. Upon completion of the reaction the reaction mixture may be filtered and the filtrate concentrated by distillation under reduced pressure to a temperature up to 80° C. to obtain as a residue S-(ethylxanthoyl) piperidyl thiophosphoric chloride. This compound is an oily liquid having a density of 1.230 at 18° C. The compound and described method for its production constitute the subject matter of my copending application Serial No. 203,765, filed concurrently herewith.

In a representative preparation, 2.2 grams (0.045 mole) of sodium cyanide and 10 grams (0.035 mole) of S-(ethylxanthoyl) piperidyl thiophosphoric chloride was dispersed in 40 milliliters of benzene and the resulting mixture heated with stirring for 3 hours at the boiling temperature and under reflux. At the end of this period the mixture was filtered and the filtrate concentrated by distillation under reduced pressure to a temperature up to 80° C. to obtain as a residue 7 grams of an ethylxanthoylthioxy-piperidyl-cyanophosphine oxide product. The latter compound was a viscous oil having a density of 1.215 at 18° C.

I claim:

Ethylxanthoylthioxy-piperidyl-cyanophosphine oxide.

HENRY TOLKMITH.

No references cited.